Figure 1:
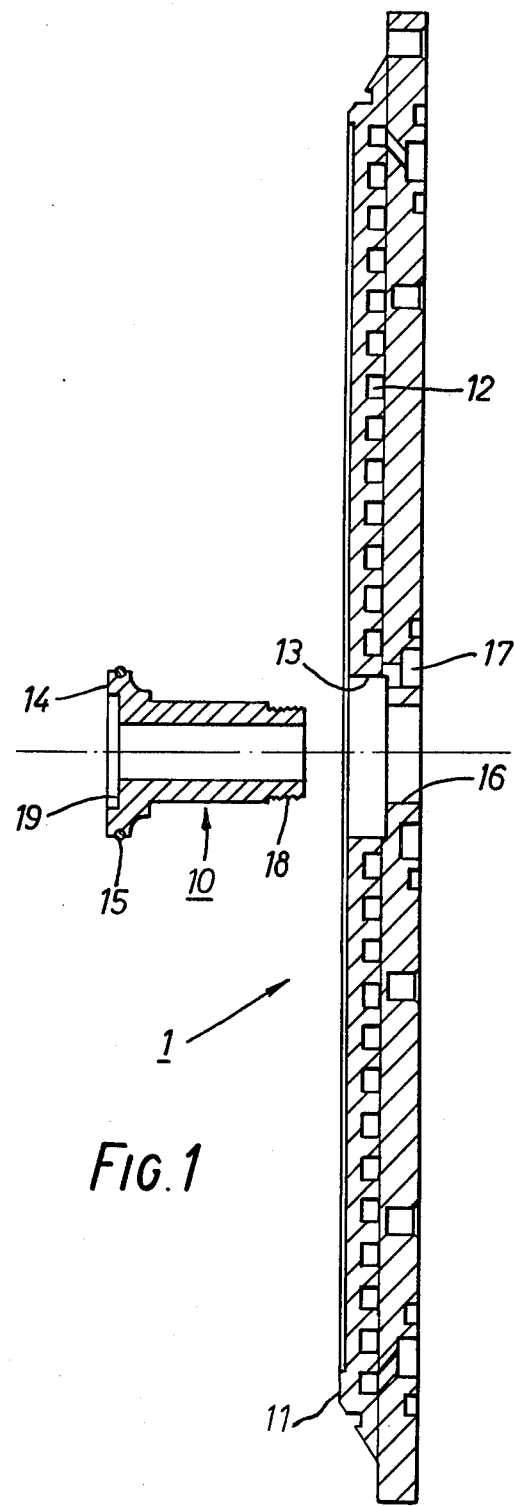

United States Patent [19]

Strausfeld

[11] 4,141,531
[45] Feb. 27, 1979

[54] DISC RECORD PRESS

[75] Inventor: Hermann Strausfeld, Cologne, Fed. Rep. of Germany

[73] Assignee: EMI Electrola Gesellschaft mit beschrankter Haftung, Cologne, Fed. Rep. of Germany

[21] Appl. No.: 763,515

[22] Filed: Jan. 28, 1977

[30] Foreign Application Priority Data

Feb. 29, 1976 [GB] United Kingdom ............... 3617/76

[51] Int. Cl.² ................. B29D 17/00; B29C 17/00
[52] U.S. Cl. .............................. 249/80; 249/79; 425/116; 425/810; 425/407
[58] Field of Search ................ 425/46, 810, 116; 249/79, 80

[56] References Cited

U.S. PATENT DOCUMENTS

| 1,307,812 | 6/1919 | Errickson | 425/810 |
| 1,576,642 | 3/1926 | Bishop | 425/810 |
| 1,943,947 | 1/1934 | Bungay | 425/46 |
| 2,501,823 | 3/1950 | Leedom | 425/810 |
| 3,474,494 | 10/1969 | Damm et al. | 425/116 |
| 3,830,459 | 8/1974 | Strausfeld | 425/810 |
| 3,918,875 | 11/1975 | Phillipson et al. | 425/810 |

FOREIGN PATENT DOCUMENTS 881736 11/1961 United Kingdom.

Primary Examiner—J. Howard Flint, Jr.
Attorney, Agent, or Firm—Fleit & Jacobson

[57] ABSTRACT

A press element for a disc record press which is heated and cooled by the passage of hot and cold fluids is made from materials of different thermal conductivity so that parts of a surface on which a matrix is attached in use which are further from a fluid channel are related to material of higher thermal conductivity than those parts of the surface which are nearer to a fluid channel.

9 Claims, 3 Drawing Figures

DISC RECORD PRESS

This invention relates to the manufacture of disc records in a press and more especially to the member on which a disc moulding matrix is supported.

When a disc record is produced in a press by forcing mouldable material into contact with a mould matrix (a negative of the required disc record surface form) it is convenient to supply heat to assist the material to adopt the required form more quickly and then remove heat to speed the setting of the material in the required form. Various proposals have been made, in connection with pressing disc records, to incorporate fluid flow paths in the press bolster supporting the matrix so that a hot fluid, e.g. steam, and then a cool fluid, e.g. cold water, can be circulated in turn. However it is desirable that the temperature of the matrix surface is uniform and changes in a uniform manner and, while previous proposals have achieved a reasonably uniform temperature and temperature change, this has entailed making the change relatively slowly. The time required for this change can be the longest part of the operating cycle of an automatic disc record production machine and therefore limit the production rate of the machine.

It is an object of the invention to provide a disc record press member by which the attainment of a uniform temperature in the mould is expedited.

According to the invention there is provided a mould member for a disc record press to which in operation the record moulding matrix is attached in contact with one surface thereof, and which has at least one internal channel for a temperature control fluid usable to adjust the temperature of the matrix, the mould member being composed of different parts assembled in heat conductive relationship, a part of higher thermal conductivity being provided between the channel and said one surface where the path length to the surface is relatively great, and a part of lower thermal conductivity being provided between the channel and said one surface where the path length to the surface is relatively small.

The middle part of the mould member and/or the edge part of the mould member may be a separate portion of material of better thermal conductivity than the rest of the support. This part may be of beryllium-copper, aluminium-bronze or copper-aluminium bronze alloy and the rest may be of steel. The middle part may be a portion of mushroom shape, provided with seal, which may be an O-ring, to the support and secured through the support to provide an annular passage linked to a fluid flow port. The edge part may be a bevelled ring shrink-fitted to the support and providing an annular passage linked to a fluid flow port.

Figure 2:
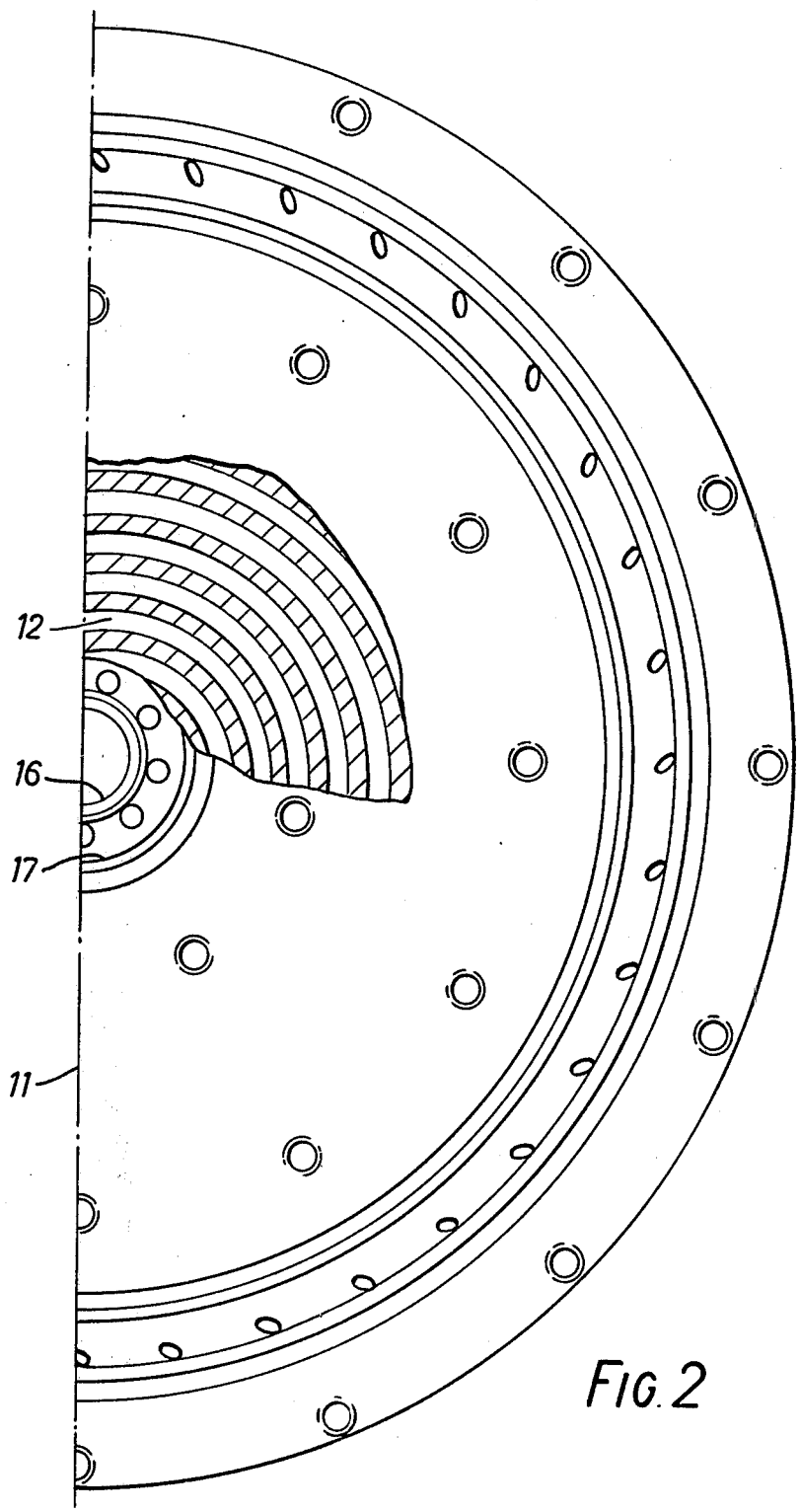
Figure 3:
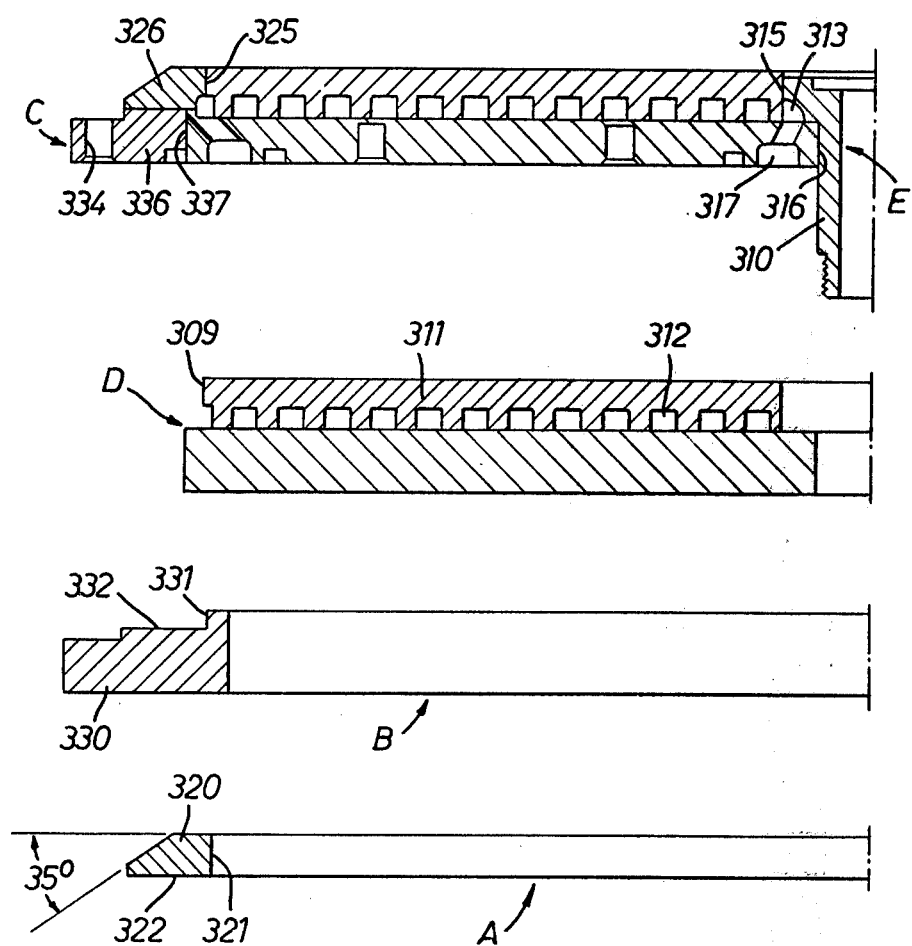

Embodiments of the invention will now be described with reference to the accompanying drawings in which:

FIG. 1 shows a diametral cross-section of a disc record mould matrix support in exploded form, FIG. 2 shows a plan view partly in section of the support of FIG. 1, and FIG. 3 shows another form of mould matrix support.

In the pressing of disc records by introducing mouldable material between supported matrices, by transfer of a "shot" or by injection, and applying pressure and heat to impart the form of the matrix to the material it is well known to include fluid flow channels in the matrix supports. These channels are often of spiral form in plan to improve the even distribution of fluid and therefore the heating or cooling effect imparted by the fluid to the mould support. However at the middle of the mould the spiral grooves come together around a body of support material and the thicker material here slows down the response of the surface temperature of the middle of the mould support, and therefore of the supported and attached matrix, when the temperature control fluid changes.

As shown in FIG. 1 the middle of the support or bolster 1 has a separate centre portion 10 inserted in the other portion 11 of the support. The spiral grooves 12 of portion 11 meet in an annular passage 13 formed at the junction of the portions 10 and 11 and between the portions.

The portion 10 is formed of material of higher thermal conductivity than portion 11 so that the surface 14 of the portion 10, which is relatively remote from the fluid flow channels, can respond to changes of fluid temperature more quickly than would a similar thickness of the material of portion 11. This quicker response compensates for the greater thickness of the material between the fluid flow channels and the surface of the middle portion. By choosing the material for portion 10 having regard to thickness and thermal conductivity and the thickness of material in portion 11 over the spiral channels the temperature of the surface of the middle portion of the mould will follow changes in the temperature of the rest of the mould surface more quickly than hitherto. The matrix is secured to the centre of the bolster using recess 19, in known manner.

In a particular example, in which the portion 10 was of beryllium copper and the portion 11 of steel, the time for a matrix attached to the surface of the mould support to change from one temperature to another sufficiently evenly for record moulding was so reduced that a complete moulding cycle was reduced from 22 to nearly 18 seconds. Suitable materials for portion 10 include beryllium copper, and copper-aluminium or aluminium bronze.

As seen in detail in FIG. 1 portion 10 is a mushroom shaped element fitting into a recess in the portion 11. The portion 10 is sealed to portion 11 by an O-ring 15 and is a good fit in bore 16 of portion 11. The portion 10 is secured by a nut (not shown) on thread 18. A fluid flow part is formed by the annular groove 17 as is known in the art. Multiple connections between groove 17 and the spirals 12 may be provided as described in U.K. Patent No. 1,437,175 or U.S. Pat. No. 3,830,459.

The provision of a middle part of a record mould of higher thermal conductivity as described permits the more rapid attainment of a uniform mould surface temperature on heating or cooling the mould. This permits a shorter cycle for moulding a record to be used and thereby increases the productivity of a press, particularly an automatic record press, by reducing the length of the operating cycle. The more even attainment of a changed temperature reduces the risk of cracking the mould.

FIG. 3 shows another mould support embodying the invention in which both the edge and the middle of the support are of material of higher thermal conductivity than the rest of the support. As mentioned above the thickness of material at the middle slows down the response of the support, and therefore the matrix, to temperature changes. Similarly the edge of the support include thickened material which produces a path length from the fluid flow channels which is relatively greater than the path length in the support part intermediate the middle and the edge. The edge and middle can be regarded as deviating from the regular arrangement of channels found in this intermediate portion. To overcome this problem, at least to a great extent, the mould support of FIG. 3 is used.

The mould support of FIG. 3 is constructed of several piece parts of different materials. An edge part, C, is fabricated from parts A and B. Part A is a bevelled ring 320 of CCB-Hovadur, or like material, which is of higher conductivity than the steel (X20Cr13) used for part B, collar 330. Parts A and B are formed so that when assembled the junction of surfaces 322 and 321 of ring 320 seats in the corner formed by the junction of surfaces 331 and 332 of collar 330. Surfaces 332 and 322 are electron beam welded together to provide a fluid-tight joint secure against any differential expansion of the parts A and B. The welded parts A and B are then machined to the form of Part C, bevelled ring 336 now having a section of a fluid channel cut into face 325 and collar 336 having a tapped hole 334, for the matrix clamp, and face 337 recessed from the plane of face 325.

Part D is the intermediate portion constructed of two steel (X20Cr13) sections brazed together under vacuum to make a fluid tight joint where channels such as 312 are cut into the under-surface of section 311, on the outer surface of which is placed the matrix (not shown) when a disc record is to be pressed. Edge 309 is prepared to make a shrink fit with face 325 and the rest of ring 326.

Part E is a central portion 310 similar to that shown and described in FIGS. 1 and 2, of the higher conductivity material such as CCB-Hovadur. The form of part E differs slightly from FIGS. 1 and 2 in that part E is arranged to shrink-fit at 315 and 316 to provide a fluid-tight seal for channel 313 connected to part 317.

The assembly of parts C, D and E to form the mould support involves the shrink-fitting of the parts C and E to part D to make a good thermal connection. A liquid adhesive may be used as well. The assembled mould support is then usuable as described above with the further advantage that the inequalities at the edge and middle are compensated for.

The mould support described above is suitable for the production of disc records in injection or compression or injection/compression presses. For example the presses described and claimed in U.S. Pat. Nos. Re.26,911 and Re.27,184, and 3,635,622, the disclosures of which are incorporated herein by reference. The techniques are also suitable for use with other method of making disc records by applying pressure between a mouldable material and a mould.

I claim:

1. A disc record press mould member to which mould member, in operation of the press, a record moulding matrix is attachable in thermal contact with one surface of the mould member to be supported by said one surface, and which mould member has at least one internal channel for a temperature control fluid usable to adjust the temperature of the matrix, the mould member being composed of parts of different thermal conductivity materials assembled in heat conductive relationship, one of said parts formed of a material selected to have a higher thermal conductivity being provided between the channel and said one surface of the mould member where the path length to the surface is relatively great, and a further one of said parts formed of a material selected to have a lower thermal conductivity being provided between the channel and said one surface of the mould member where the path length to the surface is relatively small, thereby to reduce the delaying effect of the longer path length on the time elapsing before the temperature of the record moulding matrix is adjusted to a uniform value by the heat flow along said paths from temperature control fluid in said channel.

2. A mould member according to claim 1 in which a said mould member part of higher thermal conductivity is provided for at least one of a middle region and an outer, edge, region of the mould member surface, the middle region corresponding to the centre of the disc record and the edge region corresponding to the rim of the disc record, and in which mould member the part of lower thermal conductivity is provided as an intermediate part of the mould member for a region of the mould member surface, corresponding to the grooved surface of the disc record, including said channel beneath said mould member surface.

3. A mould member according to claim 1 in which the material of said one part of higher conductivity is of one of the materials beryllium-copper, aluminium bronze and copper-aluminium bronze.

4. A mould member according to claim 1 in which the material of said further part of lower conductivity is of steel.

5. A mould member according to claim 2 in which said part for the middle of the mould member is in the form of a mushroom with a central bore and is sealed to the adjacent said intermediate part of the member.

6. A mould member according to claim 2 in which the edge part of the mould member is a bevelled ring around and sealed to the adjacent said intermediate part of the member.

7. A mould member according to claim 1 in which the heat conductive relationship is produced by shrink-fitting the different parts together.

8. A mould member according to claim 1 in which said part of higher thermal conductivity forms a section of said internal channel for a temperature control fluid.

9. A disc record press for making disc records by pressure in a mould on mouldable material, the apparatus including a press member formed of several portions of material having a surface to be cyclically heated and cooled during the making of discs, in which member different portions having their respective parts of said surface at different distances from means by which heating and cooling is brought about are formed using materials of different thermal characteristics, whereby the effect of said different distances on the uniformity of the temperature of said surface during said cycle of heating and cooling is reduced.

* * * * *

UNITED STATES PATENT AND TRADEMARK OFFICE
CERTIFICATE OF CORRECTION

PATENT NO. : 4,141,531
DATED : February 27, 1979
INVENTOR(S) : Hermann STRAUSFELD It is certified that error appears in the above–identified patent and that said Letters Patent are hereby corrected as shown below:

In Section [30], under Foreign Application Priority Data, change "February 29, 1976" to --January 29, 1976--.

Signed and Sealed this

Twenty-fifth Day of March 1980

[SEAL]

Attest:

SIDNEY A. DIAMOND

Attesting Officer

Commissioner of Patents and Trademarks